Patented Feb. 23, 1932

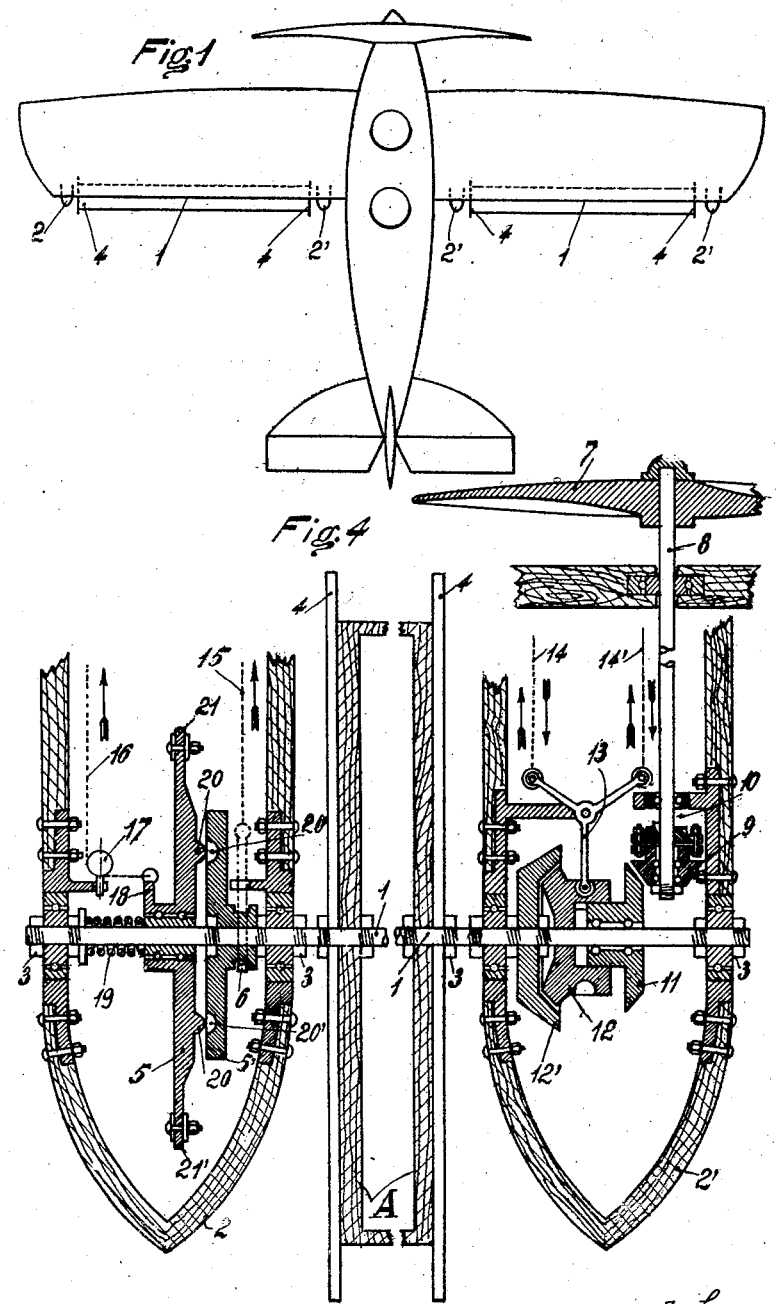

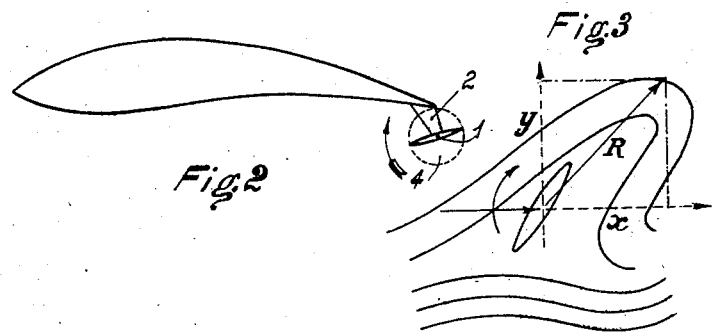
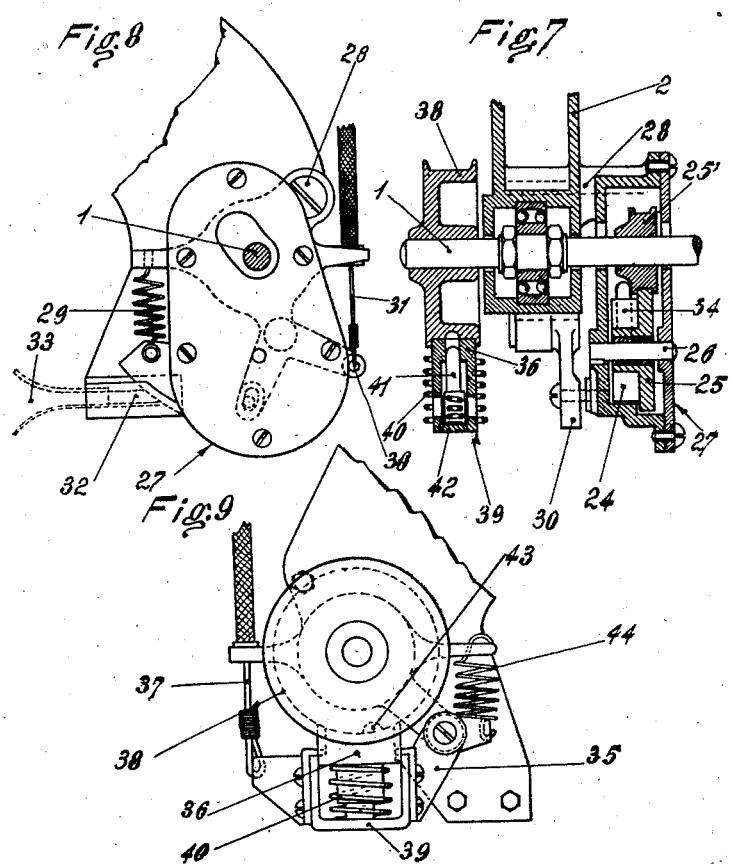

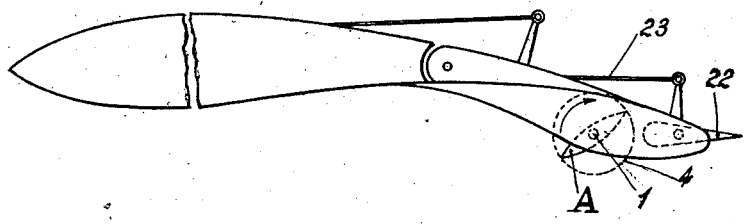
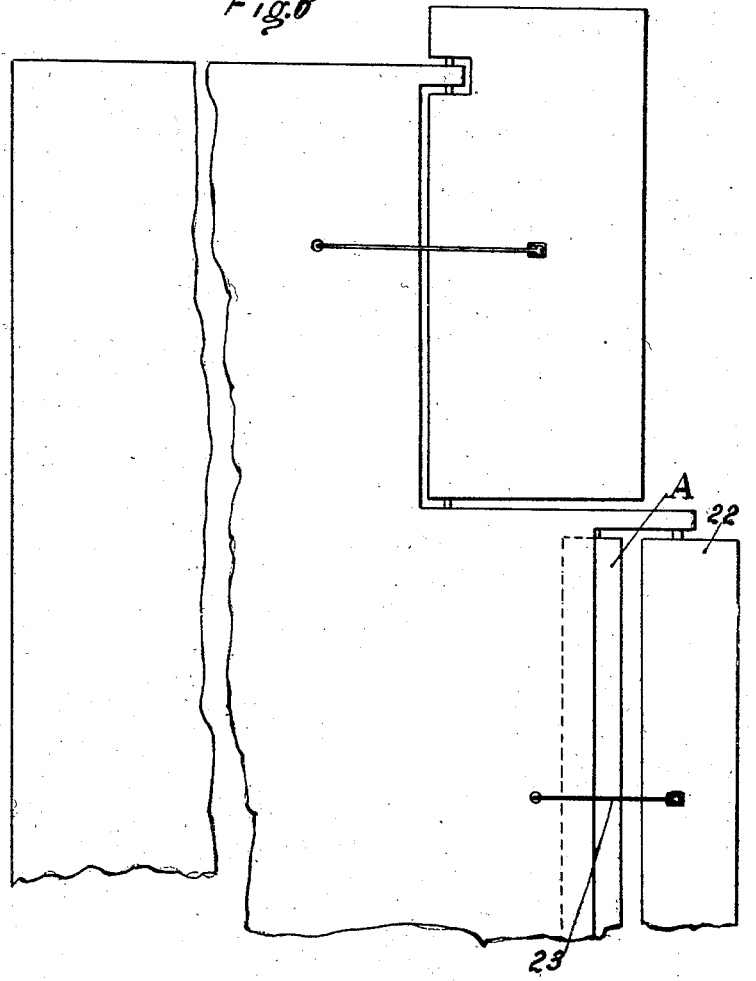

1,846,562

UNITED STATES PATENT OFFICE

ANTONIO LONGO AND GAETANO LONGO, OF MILAN, ITALY

ROTATING WING DEVICE FOR INCREASING THE CARRYING CAPACITY OF AEROPLANE WINGS

Application filed August 20, 1928, Serial No. 300,744, and in Italy August 22, 1927.

The subject matter of the present invention is a rotating wing device by which the carrying capacity of aeroplane wings is increased.

The invention consists in a novel application of the stabilizer forming the subject matter of the Longo Italian Patent N. 242,602. The fundamental idea of this previous patent was that of providing aeroplanes with rotating wings in such a manner that the rotation of said wings gave origin to an upward drift which should assist in decreasing the fall speed of the aeroplane and besides make the aeroplane describe a characteristic curve trajectory.

The device according to the present invention is based on the principle of the rotating wing and is essentially distinguished by the fact that it comprises at least one small wing arranged to rotate about its longitudinal axis, preferably below the plane of a corresponding ordinary main wing, along the rear edge of the latter wing in such a manner that the rotation of the rotatable small wing combined with the travelling movement of the aeroplane gives an upwardly directed component increasing the carrying capacity of the apparatus.

The rotation of the said small wing can be brought about either automatically through the relative wind, or it can be brought about mechanically by a driving apparatus.

The subject matter of the invention is illustrated, by way of example only, by the accompanying drawings in one of its execution forms.

Fig. 1 is a plan and diagrammatically shows an aeroplane fitted with the device according to the invention applied to the main wings of the apparatus.

Fig. 2 shows the main wing fitted with rotating small wing, as seen from the rear.

Fig. 3 is a diagram of the forces acting upon the rotating small wing.

Fig. 4 shows the general arrangement of the rotating small wing to a larger scale, the small wing being shown in longitudinal section.

Figs. 5 and 6 show in profile and in plan respectively a main wing fitted with rotating small wing and with an auxiliary movable small wing.

Figs. 7, 8, 9 show a modified form of the control arrangement for the rotating wing.

The device according to the invention essentially comprises the small wings A revolvable about the longitudinal axis 1 and carried by supports 2—2' through the intermediate of bearings 3 in such a manner that they lie underneath the plane of the main wings, along the rear edge thereof. The small wings A are fitted at their end with a disc 4.

The end supports 2' also serve to carry a mechanical drive for starting the wing A; the center supports 2' serve to carry the operating gear for the clutch 5—5' and for the ribbon brake 6. The starting apparatus for the small wings comprises a propeller 7 fitted at the forward edge of the main wing and actuated by the relative wind. The axis 8 of the propeller 7 has fitted on its inner end (lodged inside of the support 2') a bevel gear 9 combined with a free wheel arrangement 10; the bevel wheel 9 meshes with a bevel wheel 11 loosely revolvable on the axis 1 of the rotating small wheel A.

12—12' is a clutch actuated by a lever 13, which in its turn is actuated, by means of pull-wires 14—14', by another lever not shown on the drawing and mounted in the cockpit within reach of the pilot. The pilot can also actuate the band brake 6 by means of the rod 15. Instead, the actuation of the clutch 5—5 is effected by means of the pull-wire 16 which passes round a grooved pulley 17 and connects to an extension 18 of the disc 5 slidably mounted on the axis 1; a spring 19 is always tending to force the disc 5' towards the disc 5 invariably secured on the axis 1. The disc 5 has hemispherical projections, for instance two, matching two concave recesses provided in the fixed disc 5' along a diameter parallel to the fixed trimmings of the apparatus. To the ends of the levers 21—21' (secured to the disc 5) two links are attached leading to a lever mounted within pilot's reach so that the pilot can vary the angular position of the clutch 5—5' and therewith also of the axis 1; the pilot can therefore also vary the inclination of the small wing A, of course when the clutch is in closed position.

The working of the device is as follows:

Let us suppose the small wing A to be completely free, that is to say, let us suppose both the clutchs (5—5') and (12—12') to be open.

On starting, the pilot operates the friction clutch 12—12' by means of the corresponding lever, whereupon the revolving movement of the propeller 7 will be transmitted to the small wing A in the proper direction (Fig. 2). Owing to the relative wind, the wing A commences to revolve automatically and the pilot may now disconnect the clutch 5—5' that has become unnecessary.

The composition of the revolving movement of the wing A and travelling movement of the apparatus (Fig. 3) engenders a resultant R directed upwardly and inclined, which can be split into an horizontal component —$x$— and a vertical component —$y$— upwardly directed. It will be obvious that the carrying capacity of the apparatus as well as the resistance are increased; yet the value of the ratio $Ky : Kx$ relative to the efficiency, with negative angles of incidence and with the positive angles of incidence lying in the neighborhood of zero is greater than that of a main wing not provided with small wing A according to the invention. With normal angles of incidence the carrying capacity becomes greater and the efficiency becomes lower than that of a main wing having no small wing. At all events the efficiency remains constant through a range corresponding to angles of incidence varying by about 15° from minimum to maximum.

In order to adjust the aeroplane transversely about the longitudinal axis for the purpose of restoring the equilibrium or taking a curve, the pilot operates the brake 6 of the small wing attached to the main wing that must be lowered. In this manner, by diminishing the peripheral velocity and therewith the carrying capacity of the braked small wing, the pilot diminishes the carrying capacity of the main wing to which it is attached. The carrying capacity of the other main wing remaining unaltered, this main wing will tend to rise.

The invention is particularly advantageous in bombing aeroplanes. In this case, after the load has been exhausted, the pilot can bring about the maximum speed by slowly and simultaneously operating the brake 6 and the friction clutch 5—5'. In consequence of the position now occupied by the hemispherical projections 20 and by the corresponding hemispherical recesses, 20, the small wing will stop in a position parallel to the main wing.

When this position is reached, the pilot can operate the small wing A like an ordinary aileron by means of the pulling wires attached to the ends of the levers 21—21' invariably attached to the disc 5. In this manner the best conditions for normal flight are established.

In the modification shown on Figs. 5 and 6 an auxiliary movable wing 22 is provided, which can be actuated by means of 23. The wing 22 in the drawings is shown as arranged in the rear of the rotating wing A, but it might as well be arranged in front of the latter.

A characteristic modified arrangement for starting the rovolution of the rotating wing A is shown on Figs. 7 to 9. The arrangement comprises a turbine 24 solid with a friction wheel 25, the latter revolving on the axis 26 of the carter 27, and the carter being adapted to swing about the pin 28 carried by the support 2 of the rotating wing A. A lever 30 actuated by the pull wire 31 serves to move the carter from its normal position in which a spring 29 is constantly tending to maintain it. A pipe 32 receives the air through its bell-mouthed end 33 and delivers it into the turbine 24 through the opening 34.

As the spindle 28 is arranged eccentrically relatively to the rotation axis 1 of the small wing A, when the lever 30 is operated, the friction wheel 25 comes to bear against a further friction wheel 25' invariably keyed on the axis 1 of the rotating wing A.

The apparatus is completed by a brake essentially comprising a lever 35 with a friction block 36 attached to it, a wire 37 serving to pull the block 36 against the wheel 38. The friction block 36 is slidable in guides provided in the support 39 and is forced against the wheel 38 by the spring 40. In a recess of the block 36 a bolt 41 rests on the support 39 through the intermediary of the spring 42.

When the rotating wing A is in rest position (the pull wire 37 being tight) the block 39 bears upon the wheel 38 and the semi-spherical end of the bolt 41 engages the corresponding recess 43 provided on the wheel 38; the system accordingly works as a brake.

Working of the device: In order to start the revolving wing A, the pilot slackens the pull wires 37; the spring 44 will then act upon the lever 35 and remove the brake wheel 38 from the set; block 36, support 39, bolt 41; the wheel 38 will therefore have been released.

Simultaneously the pilot by means of a lever provided to this effect and by means of the pulling wire 31 actuates the lever 30 to the effect of removing the carter 27 from the position in which it was held by the spring 29. Air will therefore be admitted through the opening 34 and pipe 32 into the turbine 24 and the turbine will start revolving. As the carter 27 is further swung about the spindle 28, the friction wheel 25 will bear against the friction wheel 25' and thus impart the required first impulse and start the rotation of the wing A.

In order to brake the wing A and lock it in rest conditions it will suffice to operate the pulling wire 37. The brake will then act in the following manner: The friction block 36 will first be applied to the wheel 38 and start a smooth braking action.

By further pulling on the wire 37, also the bolt 41 will be brought nearer to the wheel 38 and finally engage the recess 43 therein, wherewith the rotating wing will be locked in the desired position.

Instead of by the relative wind, the small wing A may be rotated by a convenient mechanical drive in order to increase its peripheral speed over that obtainable with the relative wind, and thus improve the aeroplane efficiency.

The increase in said peripheral speed might also be obtained by providing such a ration of the gear wheel pair 9–11 (Fig. 4) and such dimensions of the blades of the propeller 7 as are best suited to increase the carrying capacity and diminish the total resistance, since the carrying capacity is a function of the ratio between the peripheral speed and the velocity of the relative wind.

Of course the various details such as shape, arrangement, construction, dimensions, application, materials etc. may be varied in practice within the spirit and scope of the invention.

What we claim and desire to secure by United States Letters Patent is:

1. In an aeroplane, the combination with a main wing, of a rotational wing device including a small wing rotatable about its longitudinal axis means for connecting the small wing to the main wing so that it is positioned below the main wing and along and in closely spaced relation to the trailing edge of said wing whereby the revolution of the rotatable wing combined with the travelling movement of the areoplane engenders an upwardly directed component by which the carrying capacity of the aeroplane is increased.

2. In an aeroplane the combination with a main wing of a rotational wing mounted below and in the vicinity of the trailing edge of the main wing, a device for starting the rotation of the wing including a propeller clutch, means between the propeller and the longitudinal axis of the wing, means for disconnecting the clutch after starting, means for braking the rotation of the wing in the desired angular position including a member rigid with the axis of the wing, another member slidably mounted on the wing for releasable engagement therewith, means for controlling the engagement of these members, and means for holding the movable member in a set position so that when engaged with the stationary member the wing will be held in the desired position.

3. In an aeroplane, the combination with a main wing, of spaced pairs of hollow supports extending downwardly and rearwardly from the trailing edge of the main wing, small wings having their longitudinal axes journalled in said supports, means mounted in certain of said brackets for imparting initial rotation to the wings, manually controlled means for moving said latter means into an inactive position when desired, means in the remaining brackets for braking said axes, and means cooperating with the latter means for releasably holding said axes in a set position of adjustment with respect to the main wing, substantially as and for the purposes set forth.

4. In an aeroplane as claimed in claim 3, wherein the braking and locking means include a stationary clutch member, a manually controlled brake band operably associated therewith, a slidable clutch member, resilient means normally tending to move said movable clutch member into engagement with the stationary clutch member, manually controlled means for holding the said clutch member in an inactive position, and manually controlled means for varying the angular disposition of the movable clutch member on the axis of the wing.

5. An aeroplane as claimed in claim 3, wherein the means for imparting initial rotation for controlling the operation thereof includes a shaft, a propeller thereon, gearing between the shaft and axis of the wing clutch members, one of which is rigid and the other of which is movably and operably connected with the gearing, and manually controlled means for moving the movable clutch member into a set or disconnected position, substantially as and for the purposes set forth.

ANTONIO LONGO.
GAETANO LONGO.